United States Patent
Derscheid

(10) Patent No.: US 10,289,696 B2
(45) Date of Patent: May 14, 2019

(54) YIELD MAPPING FOR AN AGRICULTURAL HARVESTING MACHINE

(71) Applicant: Deere & Company, Moline, IL (US)

(72) Inventor: Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 149 days.

(21) Appl. No.: 15/616,298

(22) Filed: Jun. 7, 2017

(65) Prior Publication Data

US 2018/0121467 A1 May 3, 2018

Related U.S. Application Data

(60) Provisional application No. 62/415,173, filed on Oct. 31, 2016.

(51) Int. Cl.
*G06F 19/00* (2018.01)
*G06F 17/30* (2006.01)
(Continued)

(52) U.S. Cl.
CPC ...... *G06F 17/30241* (2013.01); *A01B 79/005* (2013.01); *A01F 15/07* (2013.01);
(Continued)

(58) Field of Classification Search
CPC ... A01F 15/0833; A01F 15/0705; A01F 15/08
(Continued)

(56) References Cited

U.S. PATENT DOCUMENTS

| 4,224,867 A | 9/1980 | Gaeddert et al. |
| 4,517,795 A | 5/1985 | Meiers |

(Continued)

FOREIGN PATENT DOCUMENTS

| DE | 102005029405 A1 | 1/2007 |
| DE | 102009002439 A1 | 5/2010 |

(Continued)

OTHER PUBLICATIONS

Karl Wild, A weighing system for local yield monitoring of forage crops in round balers, Computers and Electronics in Agriculture, 23 (1999), 14 pages, pp. 119-132, Vottinger Str.36, 85350, Freising-Weihenstephan, Germany.

(Continued)

*Primary Examiner* — Edward Raymond

(57) ABSTRACT

A round baler may include a bale chamber having one or more bale forming apparatus which form a bale in the bale chamber. The round baler may include a size sensor which measures a plurality of dimensions of the bale as the bale increases in size from a partial bale to a completed bale. The round baler may include a force sensor which measures an ending weight of the completed bale. The round baler may include a location determining device which establishes a plurality of locations of the round baler corresponding to the plurality of dimensions of the bale. The round baler can determine a plurality of yields for the bale by correlating changes in the plurality of dimensions of the bale with the ending weight of the completed bale and generating a map by correlating the plurality of yields with the plurality of locations.

20 Claims, 7 Drawing Sheets

(51) Int. Cl.
- *A01F 15/07* (2006.01)
- *A01F 15/08* (2006.01)
- *G01B 21/20* (2006.01)
- *G01G 19/414* (2006.01)
- *G05B 15/02* (2006.01)
- *A01B 79/00* (2006.01)
- *G06Q 50/02* (2012.01)

(52) U.S. Cl.
CPC .............. *A01F 15/08* (2013.01); *G01B 21/20* (2013.01); *G01G 19/414* (2013.01); *G05B 15/02* (2013.01); *G06Q 50/02* (2013.01)

(58) Field of Classification Search
USPC .................................. 702/127, 150, 182–185
See application file for complete search history.

(56) References Cited

U.S. PATENT DOCUMENTS

| | | | |
|---|---|---|---|
| 4,624,180 A | 11/1986 | Strosser | |
| 4,702,066 A | 10/1987 | Newendorp et al. | |
| 4,742,768 A | 5/1988 | Sheehan et al. | |
| 4,850,271 A | 7/1989 | White et al. | |
| 4,855,924 A * | 8/1989 | Strosser | A01F 15/0833 700/117 |
| 4,924,405 A | 5/1990 | Strosser et al. | |
| 5,226,359 A | 7/1993 | Rempe | |
| 5,913,801 A | 6/1999 | Bottinger et al. | |
| 6,370,852 B1 | 4/2002 | Ohlemeyer et al. | |
| 6,378,276 B1 | 4/2002 | Dorge et al. | |
| 6,431,981 B1 | 8/2002 | Shinners et al. | |
| 7,064,282 B2 | 6/2006 | Viaud et al. | |
| 7,222,566 B2 | 5/2007 | Biziorek | |
| 7,340,996 B1 | 3/2008 | Viaud | |
| 7,437,866 B2 | 10/2008 | Smith et al. | |
| 7,478,518 B2 | 1/2009 | Kraus et al. | |
| 7,540,524 B2 | 6/2009 | Viaud | |
| 7,703,391 B2 | 4/2010 | Duenwald et al. | |
| 7,913,482 B2 | 3/2011 | Olander et al. | |
| 7,937,923 B2 | 5/2011 | Biziorek | |
| 8,200,399 B2 | 6/2012 | Madsen | |
| 8,234,033 B2 | 7/2012 | Brubaker et al. | |
| 8,326,563 B2 | 12/2012 | Kraus | |
| 8,571,744 B2 | 10/2013 | Brubaker et al. | |
| 8,596,194 B2 | 12/2013 | Kraus | |
| 9,253,941 B2 | 2/2016 | Clark | |
| 2009/0217827 A1 | 9/2009 | Duenwald et al. | |
| 2014/0013970 A1 | 1/2014 | Olander | |
| 2014/0090903 A1 | 4/2014 | Kraus | |
| 2014/0345481 A1* | 11/2014 | Olander | A01F 15/0833 100/35 |
| 2015/0257340 A1 | 9/2015 | Anstey et al. | |
| 2015/0354961 A1 | 12/2015 | Reinecke et al. | |
| 2015/0379721 A1 | 12/2015 | Good et al. | |
| 2015/0379785 A1 | 12/2015 | Brown, Jr. et al. | |
| 2016/0165803 A1 | 6/2016 | Smith | |

FOREIGN PATENT DOCUMENTS

| | | |
|---|---|---|
| EP | 1053673 A1 | 11/2000 |
| EP | 1634491 A1 | 3/2006 |
| EP | 2446732 A1 | 5/2012 |
| EP | 2974594 A1 | 1/2016 |

OTHER PUBLICATIONS

European Search Report issued in counterpart application No. 17198450.3 dated Apr. 6, 2018. (7 pages).

* cited by examiner

YIELD MAPPING FOR AN AGRICULTURAL HARVESTING MACHINE

CROSS-REFERENCE TO RELATED APPLICATIONS

This application claims the benefit of U.S. Provisional Application No. 62/415,173, titled Yield Mapping for an Agricultural Harvesting Machine, filed Oct. 31, 2016, which is hereby incorporated by reference in its entirety.

FIELD OF THE DISCLOSURE

The present disclosure relates to mapping yields for an agricultural harvesting machine.

BACKGROUND

Agricultural balers gather, compress, and shape crop material into a bale. Agricultural round balers create round or cylindrical bales. A baler that produces small rectangular bales is often referred to as a square baler. Another type of baler is one that produces large rectangular bales, often referred to as large square baler. Both round bales and square or rectangular bales can be bound with wrap, netting, strapping, wire, or twine. There is a need to accurately determine crop or harvest yield across an entire field in smaller increments than on a per bale basis.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a system which accurately determines incremental crop or harvest yields for an individual bale. In some implementations, the system accurately determines incremental crop or harvest yields for a round bale.

According to an aspect of the present disclosure, a round baler may include a bale chamber having one or more bale forming apparatus which form a bale in the bale chamber; a size sensor which measures a plurality of dimensions of the bale as the bale increases in size from a partial bale to a completed bale; a force sensor which measures a ending weight of the completed bale; and a location determining device which establishes a plurality of locations of the round baler corresponding to the plurality of dimensions of the bale. The round baler can determine a plurality of yields for the bale by correlating changes in the plurality of dimensions of the bale with the ending weight of the completed bale and generating a map by correlating the plurality of yields with the plurality of locations.

The round baler may further determine an area harvested for the bale by aggregating the plurality of locations. The baler may further divide the area harvested into a plurality of portions, and determine the yield for each of the plurality of portions by correlating the change in the plurality of dimensions of the bale with each of the plurality of portions. The round baler may further determine the plurality of yields by multiplying an incremental volumetric change of the partial bale by an average density of the completed bale and then dividing the result by a portion of the area harvested corresponding to the incremental volumetric change.

According to an aspect of the present disclosure, a round baler may include a bale chamber having one or more bale forming apparatus which form a bale in the bale chamber; a size sensor which measures a plurality of dimensions of the bale as the bale increases in size from a partial bale to a completed bale; a force sensor which measures a ending weight of the completed bale; a location determining device which establishes a plurality of locations of the round baler corresponding to the plurality of dimensions of the bale; and a controller configured to determine a plurality of yields for the bale by correlating changes in the plurality of dimensions of the bale with the ending weight of the completed bale and generating a map by correlating the plurality of yields with the plurality of locations.

The controller may further determine an area harvested for the bale by aggregating the plurality of locations. The controller may further divide the area harvested into a plurality of portions, and determine the yield for each of the plurality of portions by correlating the change in the plurality of dimensions of the bale with each of the plurality of portions. The controller may further determine the plurality of yields by multiplying an incremental volumetric change of the partial bale by an average density of the completed bale and then dividing the result by a portion of the area harvested corresponding to the incremental volumetric change.

According to an aspect of the present disclosure, a method of creating a yield map for a round baler may include forming a bale in a bale chamber; measuring a plurality of dimensions of the bale as the bale increases in size from a partial bale to a completed bale; determining a plurality of locations of the round baler corresponding to the plurality of dimensions; measuring a ending weight of the bale upon completion; determining a plurality of yields for the bale by correlating the plurality of dimensions of the bale with the ending weight of the bale; and generating a map by correlating the plurality of yields with the plurality of locations.

The method may further include determining an area harvested for the completed bale by aggregating the plurality of locations; dividing the area harvested into a plurality of regions; and determining the yield for each of the plurality of regions by correlating the change in the plurality of dimensions with each of the plurality of regions. The method may further include determining an area harvested for the completed bale via the plurality of locations; and determining each of the plurality of yields by multiplying an incremental volumetric change of the partial bale by an average density of the completed bale and then dividing the result by a portion of the area harvested corresponding to the incremental volumetric change.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
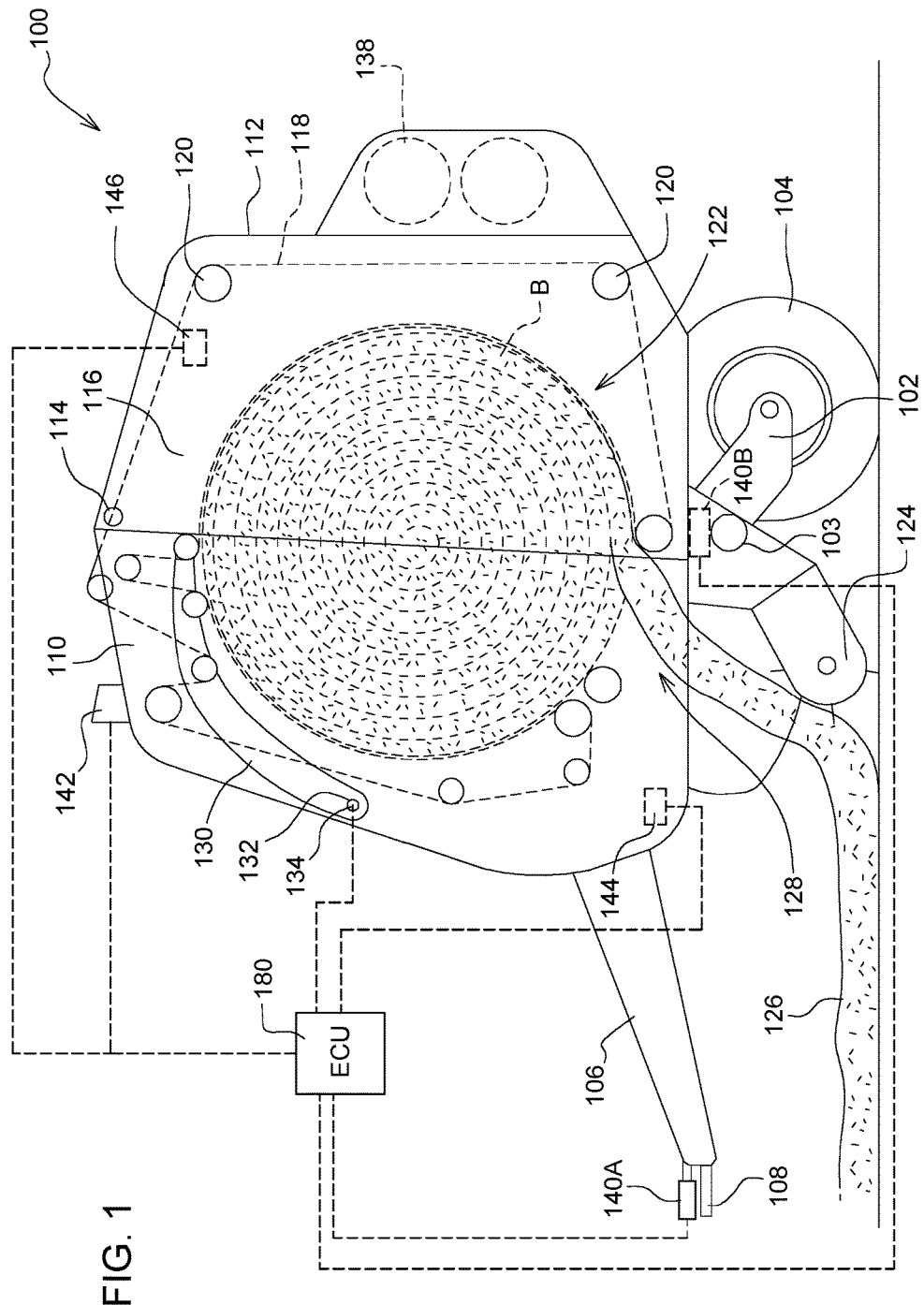
FIG. 1 is a side view of an agricultural harvesting machine.

FIG. 1 illustrates an agricultural harvesting machine 100, such as a baler, according to one embodiment. Although a round baler is shown, this disclosure can also be applied to other balers and harvesting machines. The agricultural harvesting machine 100 may be coupled to an agricultural vehicle, such as a tractor, which provides power to the agricultural harvesting machine 100, or the agricultural harvesting machine 100 may be self-propelled. The agricultural harvesting machine 100 may be combined or integrated with a cotton harvester, a combine, or other harvesting machines. For ease of reference, the remaining description will refer to the agricultural harvesting machine 100 as a baler. The baler 100 may include an electronic control unit 180, or ECU, having one or more microprocessor-based electronic control units or controllers, which perform calculations and comparisons and execute instructions. The ECU 180 may include a processor, a core, volatile and non-volatile memory, digital and analog inputs, and digital and analog outputs. The ECU 180 may connect to and communicate with various input and output devices including, but not limited to, switches, relays, solenoids, actuators, light emitting diodes (LED's), liquid crystal displays (LCD's) and other types of displays, radio frequency devices (RFD's), sensors, and other controllers. The ECU 180 may receive communication or signals, via electrically or any suitable electromagnetic communication, from one or more devices, determine an appropriate response or action, and send communication or signals to one or more devices. The ECU 180 can be a programmable logic controller, also known as a PLC or programmable controller. The ECU 180 may connect to a baler 100 electronic control system through a data bus, such as a CAN bus, or the ECU 180 can be a part of the baler 100 electronic control system.

Figure 2:
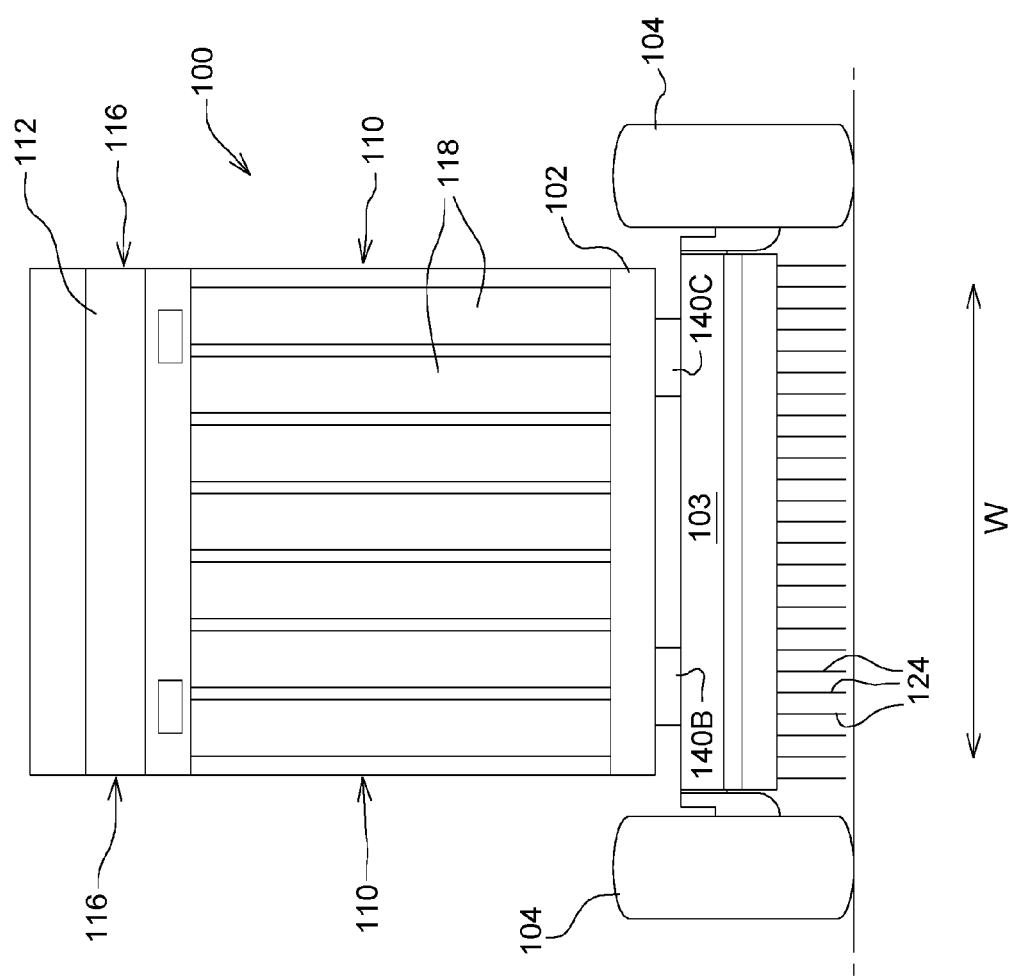
FIG. 2 is a rear view an agricultural harvesting machine, according to one embodiment.

With reference to FIGS. 1 and 2, the baler 100 may move across a field and gather and process crop material to form a crop package, such as a bale B. The baler 100 may then eject the bale B from the rear of the baler 100. The baler 100 can include a frame 102 supported on one or more ground engaging devices or wheels 104. The baler 100 can include a draft tongue 106 coupled to the frame 102 at one end with a hitch arrangement 108 at the other end configured to couple the baler 100 to an agricultural vehicle (not shown). The baler 100 can include a pair of side walls 110 fixed to the frame 102. The baler 100 can include a discharge gate 112 pivotally mounted about a pivot arrangement 114. The discharge gate 112 can include a pair of side walls 116. The discharge gate 112 is selectively operable for moving between a lowered baling position and an opened discharge position. As depicted, the baler 100 is of variable size chamber bales including a plurality of longitudinally extending side-by-side belts 118 supported on a plurality of rollers 120. A bale forming chamber 122 is defined by the side walls 110, 116, the rollers 120, and the belts 118.

As the baler 100 moves through a field, a pickup mechanism 124 feeds crop material 126 from the ground surface into a crop inlet 128 of the bale forming chamber 122, which rolls the crop material 38 in spiral fashion into a cylindrical bale B. The pick-up mechanism 124 may include various pick-up apparatus including, but not limited to, tines, forks, augers, conveyors, baffles, a cutter or pre-cutter assembly, or any combination of the preceding. A belt tensioning device 130 maintains the appropriate tension in the belts 118. The belt tensioning device 130 rotates around pivot 132 as the bale B increases in size. The position of the belt tensioning device 130 provides an indication of bale size. A bale dimension sensor 134 (e.g., potentiometer) can be coupled to the pivot point 132 of the tensioning device 130 and can provide an electrical signal correlating with the size of the bale (e.g., diameter) to an Electronic Control Unit (ECU) 180. The ECU 180 is provided for electronically controlling and monitoring a number of functions of the baler 100. For example, the ECU 180, in addition to monitoring bale size and other functions, can further be configured to trigger a twine or wrapping cycle, open and close the discharge gate, initiate bale discharge, control the application of preservative to the bale, and communicate crop moisture content and other bale related information to the operator. When the bale B attains a predetermined size, the baler 100 wraps the bale B with twine, net wrap, or other appropriate wrapping material from a wrapping arrangement 138. The baler 100 then discharges the bale B by opening the discharge gate 112, for example by actuation of gate cylinders, which permits the completed bale B to be discharged from the baler 100 onto the ground or an accumulator.

With continuing reference to FIGS. 1 and 2, the baler 100 can include one or more load or force sensors 140 (e.g., load cell) for sensing a weight of the bale B during and after bale formation in the baling chamber 122. The baler 100 can include a load cell 140A on the tongue 106 adjacent to the hitch 108. The baler 100 can also include load cells 140B and 140C which are positioned between the baler frame 102 and the axle 103. The load cells 140 can produce a signal varying with their deflection, thereby providing an indication of bale weight. The baler 100 may also include one or more distance sensors 146 to measure the size of the bale B in the bale forming chamber 122, which will be discussed in more detail below. The baler 100 may include a position sensor 142, for example a GPS satellite antenna, an inclination sensor 144, and one or more load cells 140 in communication with the ECU 180. The position sensor 142 can provide real-time location information of the baler 100. The inclination sensor 144 can provide incline, slope, or gradient information of the baler 100.

Figure 3:
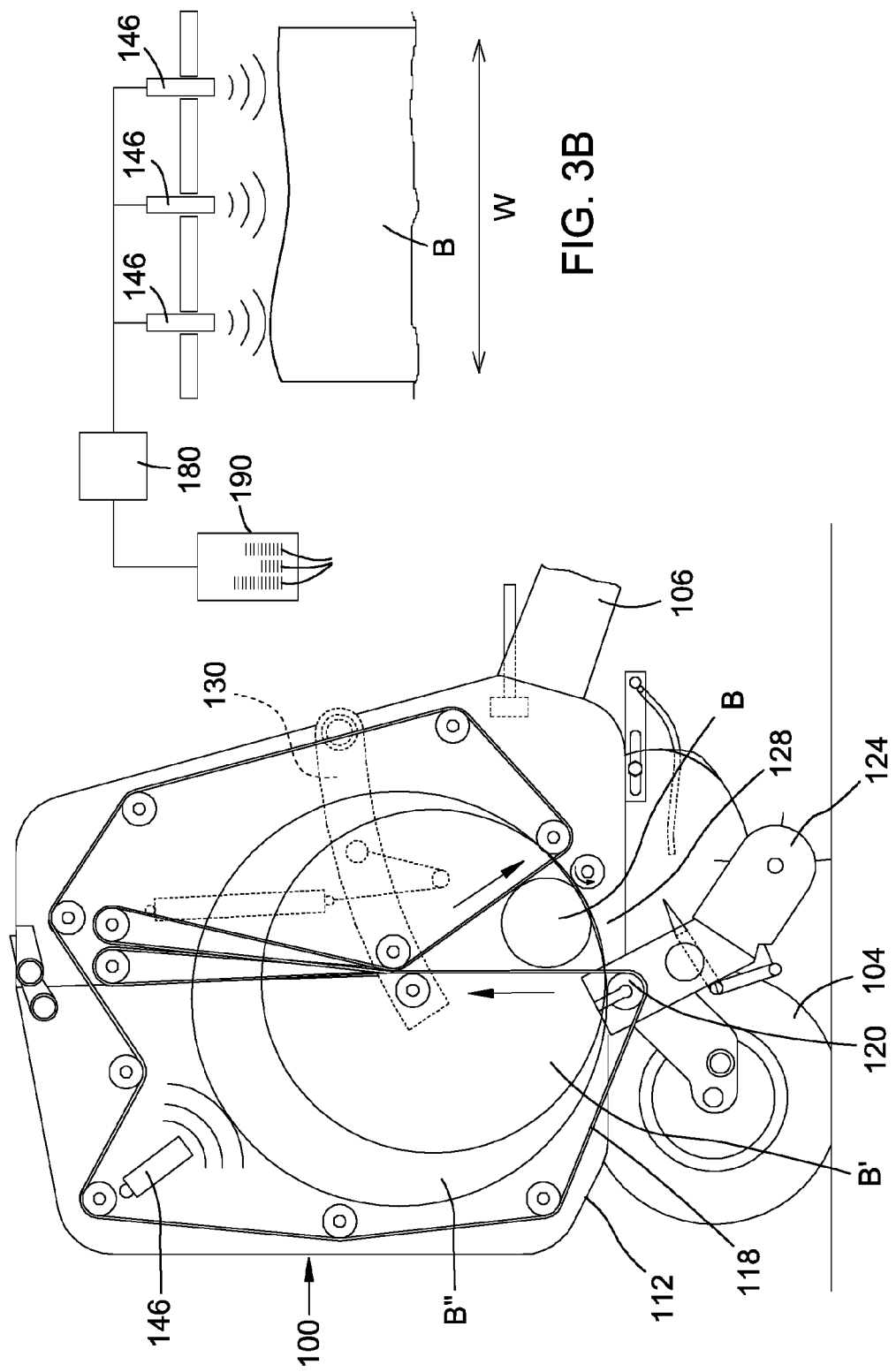
FIG. 3A is a side view of an agricultural harvesting machine, according to one embodiment.
FIG. 3B is a schematic view of a crop package measurement system, according to one embodiment.

With reference to FIGS. 3A and 3B, the baler 100 may include one or more distance sensors 146, for example any non-contact sensor such as an ultrasonic, radar, microwave, laser, or other distance measuring apparatus. The distance sensors 146 can be positioned near the rear upper portion of the discharge gate 112. In the embodiment depicted, three sensors 146 are arranged along the width W of the baler 100, with one located near each edge region of the bale B and one located near the center region of the bale B. The one or more sensors 146 detect the spacing or distance between the bale B and the sensor 146. As the bale B increases in size, shown as B' and B", the one or more sensors 146 detect or sense the change in size and communicate these measurements via signals to the ECU 180. The sensors 146 can provide measurement information regarding the change in size for each region of the bale B. The ECU 180 controls a display arrangement 190 positioned in the operator cab of the agricultural tractor. The measurement values of the sensors 146 can be displayed on the display arrangement 190 in three fields, each of which represents a region of the bale B. The measured values may be provided in graphical, representative, or numerical form.

Figure 4:
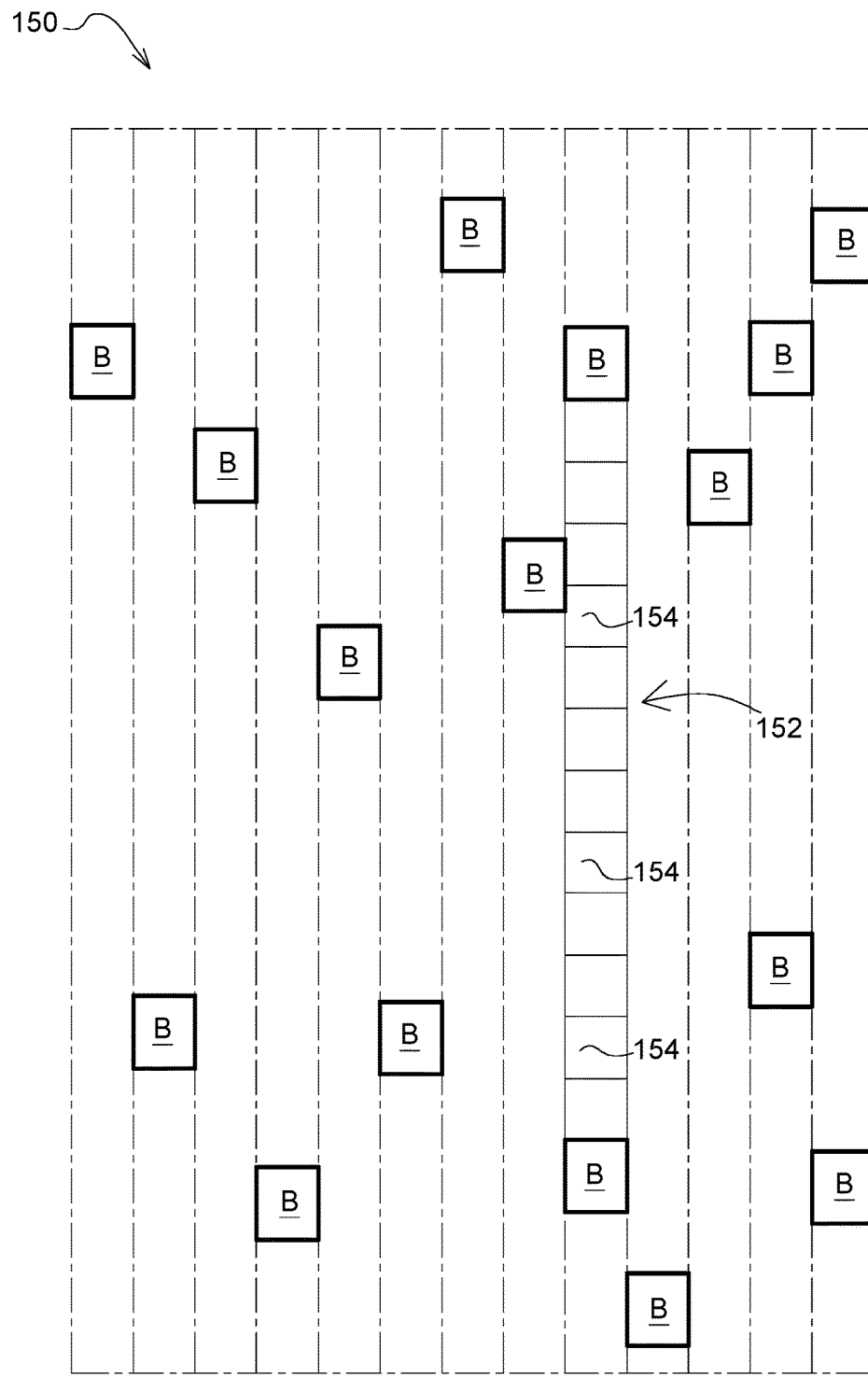
FIG. 4 is a view of a yield map, according to one embodiment.
Figure 5:
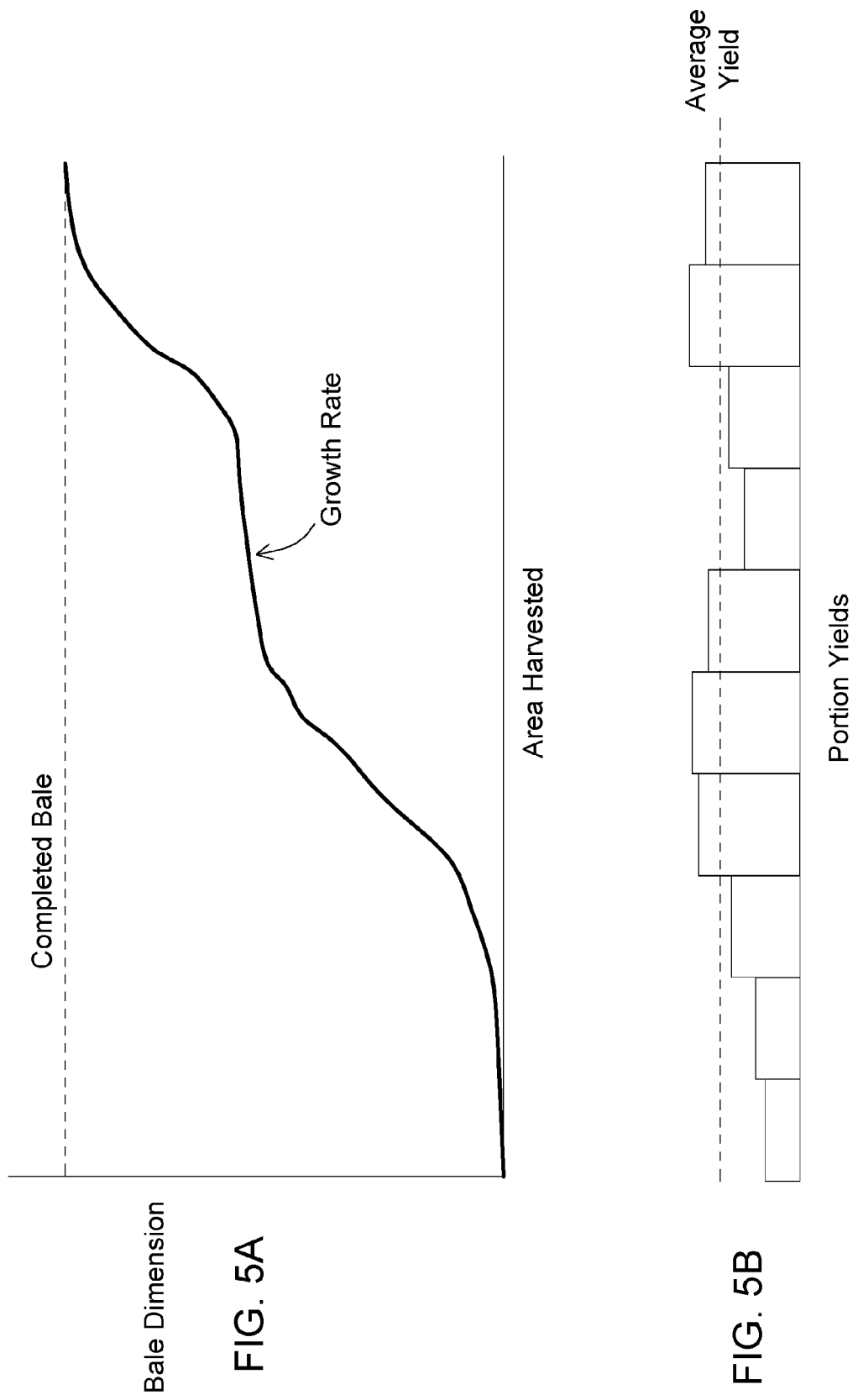
FIG. 5A is a graph of an increase in dimensions of an individual bale, according to one embodiment.
FIG. 5B is a graph of the yields for multiple portions of an individual bale, according to one embodiment.

With reference to FIGS. 4, 5A, and 5B crop or harvest yield can be determined for a finite or predetermined area of a field and displayed as yield map 150. As shown in FIG. 4, the larger area 152 represents the area harvested to generate a single bale B. The larger area 152 includes several smaller areas 154, which represent portions or regions of the area harvested corresponding to portions or sections of the single bale B. As the bale B is being generated, changes in the size of the bale (e.g., radius, diameter, volume, etc.) can be measured and stored, for example with bale dimension sensor 134, distance sensors 146, or both as depicted in FIG. 1. Alternatively or additionally, changes in the weight of the bale can be measured and stored, for example with one or more force sensors 140. While the baler 100 is moving across a field and generating a bale B, the dynamic weight measurement can fluctuate due to movement of the baler 100 in a vertical direction in response to the terrain or topography of the field. Even with these fluctuations, the dynamic weight measurements can still provide relative or comparative measurements as the bale B increases in size. When the bale B has attained a predetermined size or weight, the bale generation is considered complete. The size and weight of the completed bale B can be measured before exiting the baler 100. This final or ending measurement can occur when the baler 100 is stationary, which can provide a more accurate measurement regarding the weight.

FIG. 5A illustrates the growth of bale B in the bale forming chamber 122 as an increasing amount of area is harvested. The growth of the bale B, measured by size or weight or both, varies based upon the amount or quantity of crop material being harvested for a predetermined area. The amount or quantity of crop material can vary during the generation of an individual bale B. As shown in this example, the rate of change in the bale dimension, size or weight or both, varies during the generation of an individual bale B. The change in size of the bale B can be determined by the change in volume of the bale B represented by $$V_c = \pi (r_2^2 - r_1^2) W$$

where $r_2$ is the larger radius of the bale, $r_1$ is the smaller radius of the bale, and W is the width of the bale, or $$V_c = \pi \left( \left( \frac{d_2}{2} \right)^2 - \left( \frac{d_1}{2} \right)^2 \right) W$$

where $d_2$ is the larger diameter of the bale, $d_1$ is the smaller diameter of the bale, and W is the width of the bale. When the generation of the bale B is complete, the bale B is weighed and then ejected from the baler 100. The average density of the entire bale B can then be determined by the equation $$\rho_t = m/V_t$$

where m is the mass of the bale and $V_t$ is the volume of the completed or entire bale. For any portion or region of the area harvested for the completed bale, the yield can be determined by multiplying the change in volume of the bale ($V_c$) for the portion of the area harvested for the bale ($A_p$) by the average density of the entire bale ($\rho_t$), and then divided by the portion of the area harvested for the bale which created the change in volume represented by $$\text{Yield}_{portion} = \frac{\text{Mass}_{portion}}{\text{Area}_{portion}} \text{ or } Y_p = \frac{V_c \rho_t}{A_p}.$$

FIG. 5B illustrates the yield rates for different portions or sections of the bale. As shown in this example embodiment, the area harvested for a single bale ($A_t$) was divided into ten portions or regions ($A_p$), and the yield for each portion of the area harvested was calculated based upon the incremental volumetric change of the bale ($V_c$) for that portion of the area harvested. The yield for each portion ($Y_p$) is determined by multiplying an incremental volumetric change of the partial bale ($V_c$) by an average density of the completed bale ($\rho_t$) and then dividing the result by a portion of the area harvested during the incremental volumetric change $A_p$.

For example, if the completed bale weighed 900 kg (1,984 lbs) with a width of 1.5 m (4.9 ft) and a diameter of 1.8 m (5.9 ft), then the volume would be $$V_t = \pi \cdot \left( \frac{1.8 \text{ m}}{2} \right)^2 \cdot 1.5 \text{ m} = 3.8 \text{ m}^3,$$

and the average density of the entire bale would be $$\rho_t = \frac{\text{mass}}{\text{volume}} = \frac{900 \text{ kg}}{3.8 \text{ m}^3} = 237 \frac{\text{kg}}{\text{m}^3}.$$

Additionally, if the area harvested $A_t$ was 1 acre, or 4,047 m², then the yield for the bale would be $$Y_t = \frac{\text{total mass}}{\text{total area}} = \frac{900 \text{ kg}}{4,047 \text{ m}^2} = 0.222 \frac{\text{kg}}{\text{m}^2}.$$

Further, if the predetermined portion or region of the area harvested for the portion or section of the individual bale was 250 m², which caused the bale to increase in diameter from 1.0 m to 1.1 m, then the change in volume would be $$V_c = \pi \cdot \left( \left( \frac{1.1 \text{ m}}{2} \right)^2 - \left( \frac{1.0 \text{ m}}{2} \right)^2 \right) \cdot 1.5 \text{ m} = 0.247 \text{ m}^3,$$

and the yield for the predetermined portion or region of the area harvested would be $$\text{Yield}_{portion} = \frac{\text{Mass}_{portion}}{\text{Area}_{portion}} = \frac{\text{Volume}_{portion} \cdot \text{Total Average Density}}{\text{Area}_{portion}} =$$

$$\frac{V_c \cdot \rho_t}{A_h} = \frac{0.247 \text{ m}^3 \cdot 237 \frac{\text{kg}}{\text{m}^3}}{250 \text{ m}^2} = 0.234 \frac{\text{kg}}{\text{m}^2}.$$

For this example, the yield for the portion or section of the bale represented by the change in diameter from 1.0 m to 1.1 m $$\left(0.234 \frac{\text{kg}}{\text{m}^2}\right)$$

is larger than the average yield for the entire bale $$\left(0.222 \frac{\text{kg}}{\text{m}^2}\right).$$

For another example using the same completed bale, if the predetermined portion of the area harvested for portion or section of the individual bale was 200 m², which caused the bale to increase in diameter from 0.5 m to 0.6 m, then the change in volume would be $$V_c = \pi \cdot \left(\left(\frac{0.6 \text{ m}}{2}\right)^2 - \left(\frac{0.5 \text{ m}}{2}\right)^2\right) \cdot 1.5 \text{ m} = 0.130 \text{ m}^3,$$

and the yield for the predetermined portion or region of the area harvested would be $$\text{Yield}_{portion} = \frac{\text{Mass}_{portion}}{\text{Area}_{portion}} = \frac{\text{Volume}_{portion} \cdot \text{Total Average Density}}{\text{Area}_{portion}} =$$

$$\frac{V_c \cdot \rho_t}{A_h} = \frac{0.130 \text{ m}^3 \cdot 237 \frac{\text{kg}}{\text{m}^3}}{200 \text{ m}^2} = 0.154 \frac{\text{kg}}{\text{m}^2}.$$

For this example, the yield for the portion of the bale represented by the change in diameter from 1.0 m to 1.1 m $$\left(0.154 \frac{\text{kg}}{\text{m}^2}\right)$$

is smaller man the average yield for the entire bale $$\left(0.222 \frac{\text{kg}}{\text{m}^2}\right).$$

Figure 6:
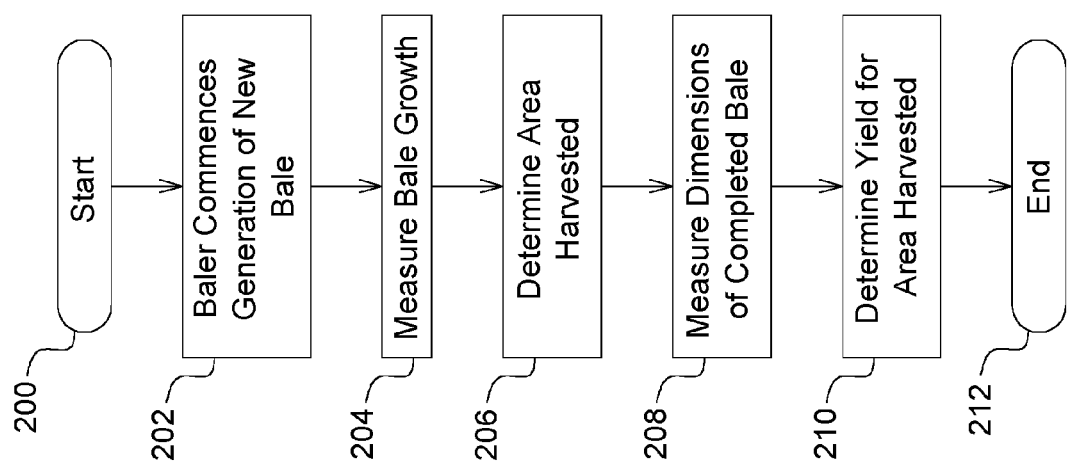
FIG. 6 is a flow chart for a method of determining the yield for a portion of a completed bale, according to one embodiment.

FIG. 6 illustrates a method of determining the yield for a portion of an entire or completed bale, which may be implemented in one or more of the embodiments described herein and depicted in the various FIGURES. At step 200, the method starts.

At step 202, the baler 100 commences the generation of new bale B.

At step 204, the baler 100 measures the growth or increase in dimensions of the bale B from beginning to completion of the bale generation. The ECU 180 can perform these measurements based upon communication with one or more sensors.

At step 206, the baler 100 determines and tracks the area harvested corresponding to the change in bale dimensions and the area harvested for generation of the bale. The ECU 180 can perform this operation based upon communication with one or more sensors. Steps 204 and 206 can occur concurrently.

At step 208, the baler 100 measures the dimensions of the completed bale B. The ECU 180 can perform these measurements based upon communication with one or more sensors.

At step 210, the baler 100 determines the yield for the area harvested for the completed bale B, and for any predetermined portion or region of the area harvested. The ECU 180 can perform these yield determinations and generate a yield map 150.

At step 212, determining the yield for a portion of a completed bale has occurred, according to one embodiment. In other embodiments, one or more of these steps or operations may be omitted, repeated, or re-ordered and still achieve the desired results.

Figure 7:
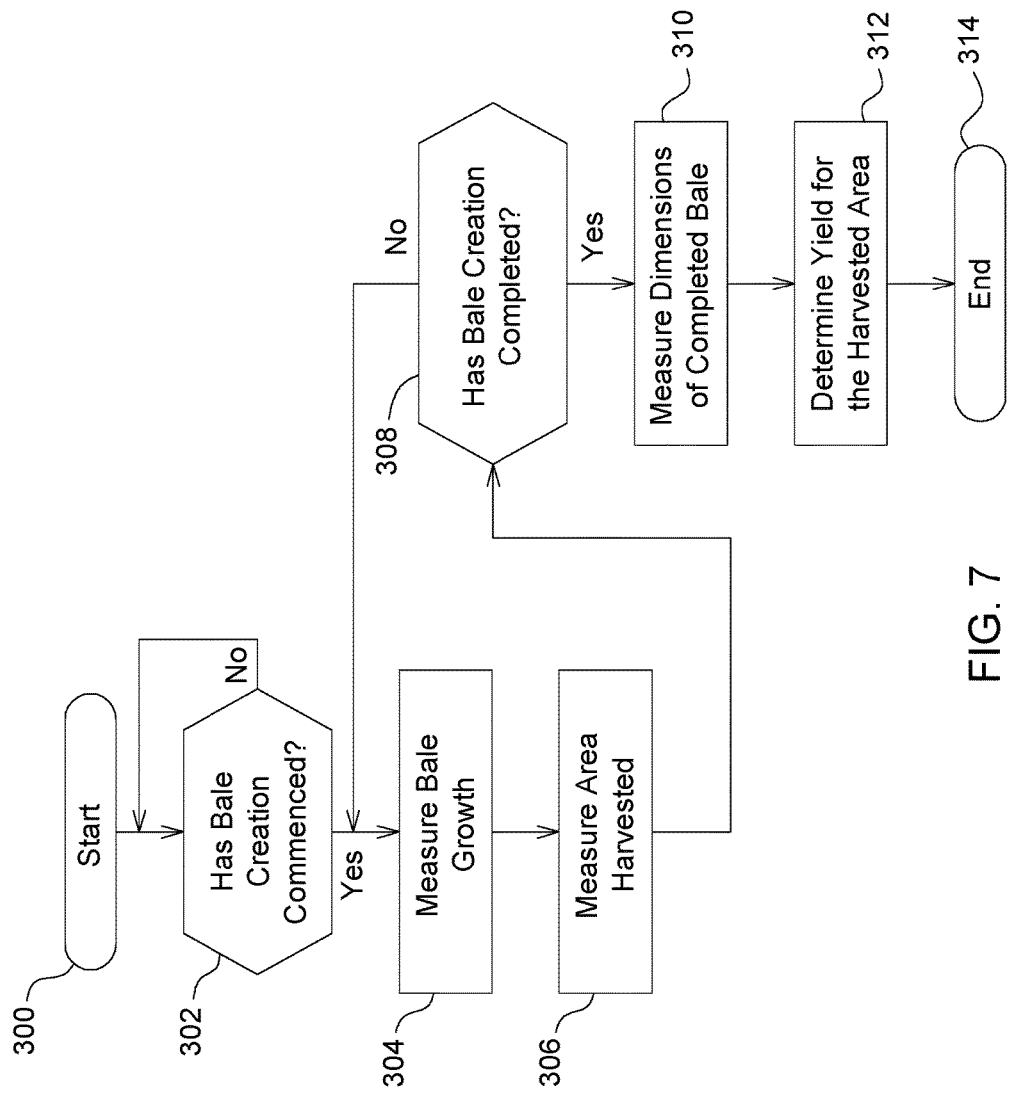
FIG. 7 is a flow chart for a method of determining the yield for a portion of a completed bale, according to one embodiment.

FIG. 7 illustrates a method of determining the yield for a portion of an entire or completed bale, which may be implemented in one or more of the embodiments described herein and depicted in the various FIGURES. At step 300, the method starts.

At step 302, the ECU 180 determines whether the baler 100 has commenced the generation of a new bale B via communication with one or more sensors. If no, the method repeats step 302. If yes, then the method continues with step 304

At step 304, the ECU 180 determines the growth or increase in dimensions of the bale B from beginning to completion of the bale generation via communication with one or more sensors.

At step 306, the ECU 180 determines the portion of the area harvested corresponding to the change in bale dimensions and the area harvested for the generation of the bale via communication with one or more sensors. The ECU 180 can perform steps 204 and 206 concurrently.

At step 308, the ECU 180 determines whether the baler 100 has completed the generation of the new bale B via communication with one or more sensors. If no, the method returns to step 304. If yes, then the method continues with step 310.

At step 310, the ECU 180 determines the dimensions of the completed bale B via communication with one or more sensors.

At step 312, the ECU 180 determines the yield for the area harvested for the completed bale B, and for any predetermined portions of the area harvested. The ECU 180 can determine a plurality of yields for the bale by correlating changes in the plurality of dimensions of the bale with the ending weight of the completed bale. The ECU 180 can determine the plurality of yields by multiplying an incremental volumetric change of the partial bale by an average density of the completed bale and then divide the result by a portion of the area harvested corresponding to the incremental volumetric change.

The ECU 180 can then generate a yield map 150 including the yields for the predetermined portions of the area harvested. The ECU 180 can determine the area harvested for the bale by aggregating the plurality of locations. The ECU 180 can then divide the area harvested for the bale into a plurality of regions and determine the yield for each of the plurality of regions by correlating the change in the plurality of dimensions of the bale with each of the plurality of regions.

At step 314, determining the yield for a portion of a completed bale has occurred, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is the yield determination for a portion of a bale. Another technical effect of one or more of the example embodiments disclosed herein is the yield determination for a portion of the area harvested corresponding to an individual bale. Another technical effect of one or more of the example embodiments disclosed herein is multiple yield determinations for an individual bale.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A round baler comprising:
    a bale chamber having one or more bale forming apparatus which form a bale in the bale chamber;
    a size sensor which measures a plurality of dimensions of the bale as the bale increases in size from a partial bale to a completed bale;
    a force sensor which measures a ending weight of the completed bale;
    a location determining device which establishes a plurality of locations of the round baler corresponding to the plurality of dimensions of the bale;
    determining a plurality of yields for the bale by correlating changes in the plurality of dimensions of the bale with the ending weight of the completed bale and generating a map by correlating the plurality of yields with the plurality of locations.

2. The round baler of claim 1, wherein an area harvested for the bale is determined by aggregating the plurality of locations, the area harvested for the bale is divided into a plurality of portions, the yield for each of the plurality of portions is determined by correlating the change in the plurality of dimensions of the bale with each of the plurality of portions.

3. The round baler of claim 1, wherein an area harvested for the bale is determined by aggregating the plurality of locations, each of the plurality of yields is determined by multiplying an incremental volumetric change of the partial bale by an average density of the completed bale and then dividing the result by a portion of the area harvested corresponding to the incremental volumetric change.

4. The round baler of claim 1, wherein the size sensor measures a plurality of diameters of the bale.

5. The round baler of claim 1, wherein the size sensor measures the movement of a belt tensioning device as the bale increases in size.

6. The round baler of claim 1, wherein the size sensor is a non-contact sensor which measures the distance between the sensor and the bale as the bale increases in size.

7. The round baler of claim 1, wherein the force sensor is a plurality of load cells located between a baler frame and one or more ground engaging devices.

8. A round baler comprising:
    a bale chamber having one or more bale forming apparatus which form a bale in the bale chamber;
    a size sensor which measures a plurality of dimensions of the bale as the bale increases in size from a partial bale to a completed bale;
    a force sensor which measures a ending weight of the bale upon completion;
    a location determining device which establishes a plurality of locations of the round baler corresponding to the plurality of dimensions of the bale;
    a controller configured to determine a plurality of yields for the bale by correlating changes in the plurality of dimensions of the bale with the ending weight of the bale and generate a map by correlating the plurality of yields with the plurality of locations.

9. The round baler of claim 8, wherein the controller is configured to determine an area harvested for the bale by aggregating the plurality of locations, divide the area harvested into a plurality of portions, and determine the yield for each of the plurality of portions by correlating the change in the plurality of dimensions of the bale to each of the plurality of portions.

10. The round baler of claim 8, wherein the controller is configured to determine an area harvested for the bale by aggregating the plurality of locations, and determine each of the plurality of yields by multiplying an incremental volumetric change of the partial bale by an average density of the completed bale and then dividing the result by a portion of the area harvested corresponding to the incremental volumetric change.

11. The round baler of claim 8, wherein the size sensor measures a plurality of diameters of the bale.

12. The round baler of claim 8, wherein the size sensor measures the movement of a belt tensioning device as the bale increases in size.

13. The round baler of claim 8, wherein the size sensor is a non-contact sensor which measures the distance between the sensor and the bale as the bale increases in size.

14. The round baler of claim 8, wherein the force sensor is a plurality of load cells located between a baler frame and one or more ground engaging devices.

15. A method of creating a yield map for a round baler comprising:
    forming a bale in a bale chamber;
    measuring a plurality of dimensions of the bale as the bale increases in size from a partial bale to a completed bale;
    determining a plurality of locations of the round baler corresponding to the plurality of dimensions;

measuring a ending weight of the bale upon completion;

determining a plurality of yields for the bale by correlating the plurality of dimensions of the bale with the ending weight of the bale; and generating a map by correlating the plurality of yields with the plurality of locations.

16. The method of claim 15, further comprising:

determining an area harvested for the completed bale by aggregating the plurality of locations;

dividing the area harvested into a plurality of regions; and determining the yield for each of the plurality of regions by correlating the change in the plurality of dimensions with each of the plurality of regions.

17. The method of claim 15, further comprising:

determining an area harvested for the completed bale by aggregating the plurality of locations; and determining each of the plurality of yields by multiplying an incremental volumetric change of the partial bale by an average density of the completed bale and then dividing the result by a portion of the area harvested corresponding to the incremental volumetric change.

18. The method of claim 15, wherein the size sensor measures a plurality of diameters of the bale.

19. The method of claim 15, wherein the size sensor measures the movement of a belt tensioning device as the bale increases in size.

20. The method of claim 15, wherein the size sensor is a non-contact sensor which measures the distance between the sensor and the bale as the bale increases in size.

* * * * *